(12) United States Patent
Wilkinson et al.

(10) Patent No.: US 10,046,689 B2
(45) Date of Patent: Aug. 14, 2018

(54) TEMPERATURE-CONTROLLED DELIVERY VEHICLE

(71) Applicant: Wal-Mart Stores, Inc., Bentonville, AR (US)

(72) Inventors: Bruce W. Wilkinson, Rogers, AR (US); Bobby J. Evans, Jr., Bentonville, AR (US); Todd D. Mattingly, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/611,288

(22) Filed: Jun. 1, 2017

(65) Prior Publication Data

US 2017/0349079 A1    Dec. 7, 2017

Related U.S. Application Data

(60) Provisional application No. 62/344,117, filed on Jun. 1, 2016.

(51) Int. Cl.
| | |
|---|---|
| *B60P 3/20* | (2006.01) |
| *B65G 1/06* | (2006.01) |
| *B60P 1/38* | (2006.01) |
| *G06Q 10/08* | (2012.01) |

(52) U.S. Cl.
CPC ........ *B60P 3/20* (2013.01); *B60P 1/38* (2013.01); *B65G 1/06* (2013.01); *G06Q 10/0832* (2013.01)

(58) Field of Classification Search
CPC .................................. B60P 3/205; B60P 1/38
USPC ........................................................ 414/679
See application file for complete search history.

(56) References Cited

U.S. PATENT DOCUMENTS

| | | | |
|---|---|---|---|
| 2,168,018 A | 8/1939 | Hartz | |
| 3,689,909 A * | 9/1972 | Cotter ................. | F25D 25/02 200/85 R |
| 4,345,869 A | 8/1982 | King | |
| 4,505,126 A | 3/1985 | Jones | |
| 5,012,653 A | 5/1991 | Ryde | |
| 5,054,295 A | 10/1991 | Goulooze | |
| 6,378,319 B1 | 4/2002 | Mani | |
| 6,467,293 B1 | 10/2002 | Goosman | |
| 6,640,569 B2 * | 11/2003 | Goosman ........... | B60H 1/3232 296/37.1 |

(Continued)

FOREIGN PATENT DOCUMENTS

| | | | |
|---|---|---|---|
| EP | 0196833 | 10/1986 | |
| WO | WO-02074663 A1 * | 9/2002 | ........... B65G 1/06 |

OTHER PUBLICATIONS

PCT; PCT App. No. PCT/US2017/035408; International Search Report and Written Opinion dated Aug. 25, 2017.

*Primary Examiner* — Mark C Hageman
(74) *Attorney, Agent, or Firm* — Fitch, Even, Tabin & Flannery LLP

(57) ABSTRACT

In some embodiments, systems, apparatuses and methods are provided herein useful to temperature-controlled delivery of items. A conveyor mechanism disposed within a temperature-controlled compartment of a delivery vehicle can provide easy access to items within the compartment. In some embodiments, the conveyor mechanism can be operated by a control circuit to convey items within the compartment to position the items adjacent to the access door according to various inputs.

18 Claims, 6 Drawing Sheets

(56) References Cited

U.S. PATENT DOCUMENTS

2003/0033825 A1    2/2003   Goosman
2005/0235884 A1   10/2005   Warlow
2015/0316311 A1   11/2015   Kopecka

* cited by examiner

TEMPERATURE-CONTROLLED DELIVERY VEHICLE

CROSS-REFERENCE TO RELATED APPLICATIONS

This application claims the benefit of U.S. 62/344,117, filed Jun. 1, 2016, which is hereby incorporated by reference herein in its entirety.

TECHNICAL FIELD

This invention relates generally to delivery vehicles and, more particularly, to temperature-controlled delivery vehicles.

BACKGROUND

Delivery of items, particularly food items, can often require the use of a temperature-controlled vehicle so that refrigerated or frozen items maintain desired temperatures during transport. The storage configuration of temperature-controlled vehicles can result in waste if a larger than necessary area is kept at refrigerated or freezing temperatures. The storage configuration can also cause access issues if a desired area is difficult to easily access due to the location of another temperature area or other items within the vehicle.

BRIEF DESCRIPTION OF THE DRAWINGS

Disclosed herein are embodiments of systems, apparatuses and methods pertaining to a delivery vehicle having a temperature-controlled compartment and a conveyor for item access. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to temperature-controlled delivery of items. A conveyor mechanism disposed within a temperature-controlled compartment of a delivery vehicle provides easy access to items within the compartment. If desired, the conveyor mechanism can be configured to convey items within the compartment to a position adjacent to an access door thereof. By some approaches, the conveyor mechanism can be operated by a control circuit that can be configured to position items adjacent to the access door according to various inputs.

Figure 1:
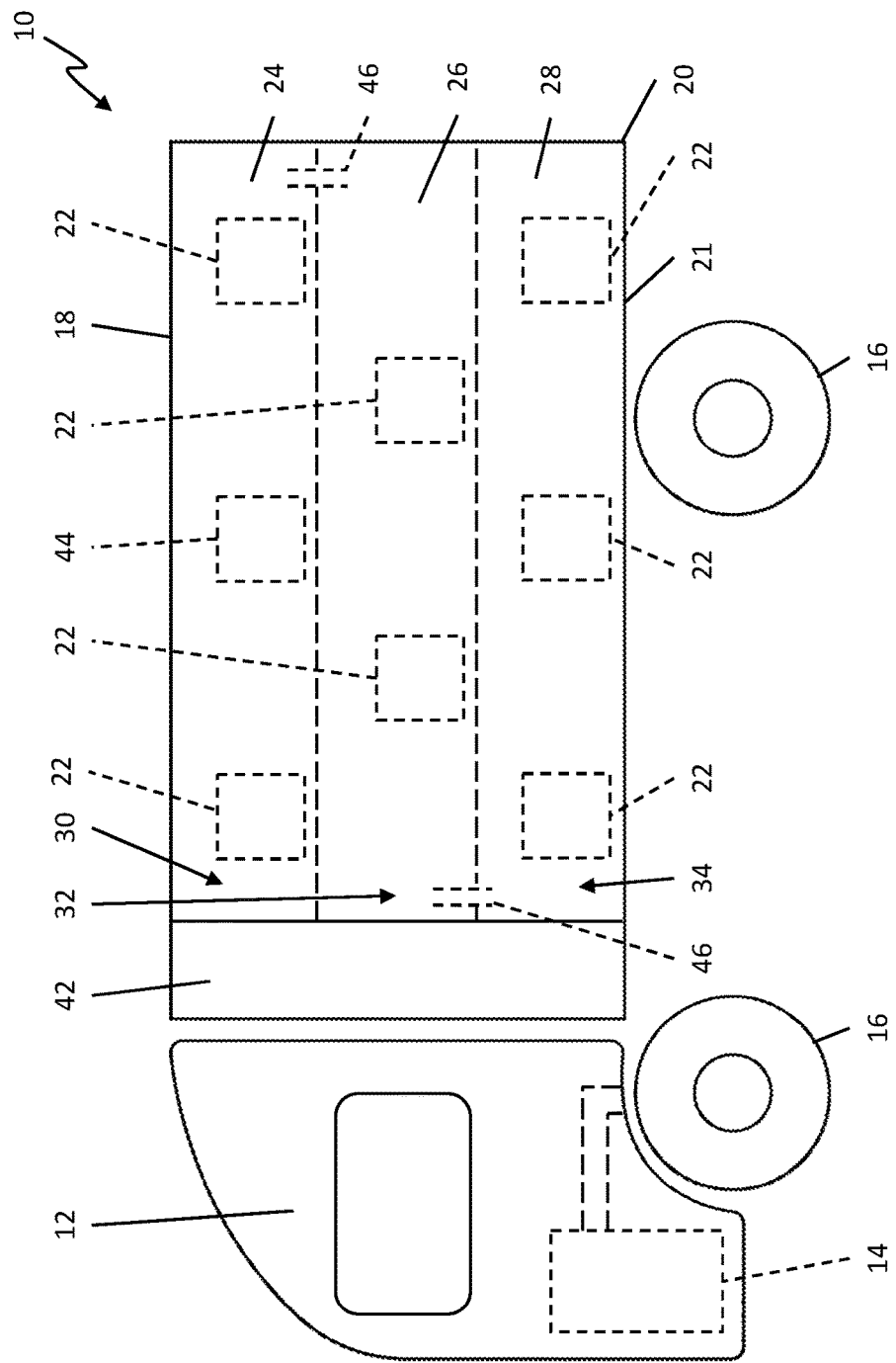
FIG. 1 is side elevation view of a delivery vehicle in accordance with some embodiments.

Details of a delivery vehicle 10 are shown in FIGS. 1-6. As shown in FIG. 1, the delivery vehicle 10 includes a passenger compartment 12, an engine or motor 14, wheels 16 including wheels configured to be driven by the engine or motor 14, a storage compartment 18, and a door 20 providing access to the storage compartment 18. The delivery vehicle can include any suitable vehicle control and propulsion mechanisms, as well known and understood in the art and, as such, require no further description.

The storage compartment 18 can be removably mounted to a frame 21 of the vehicle 10 or can be permanently secured thereto. The storage compartment 18 is temperature controlled to store and transport various items 22 therein for subsequent delivery. In one form, as illustrated in FIG. 1, the storage compartment 18 can be divided into separate temperature-controlled zones, which can include a freezer compartment 24, a refrigerated compartment 26, and a room-temperature compartment 28. If desired, the storage compartment 18 can further include or replace one of the other compartments with a non-temperature controlled compartment.

Figure 2:
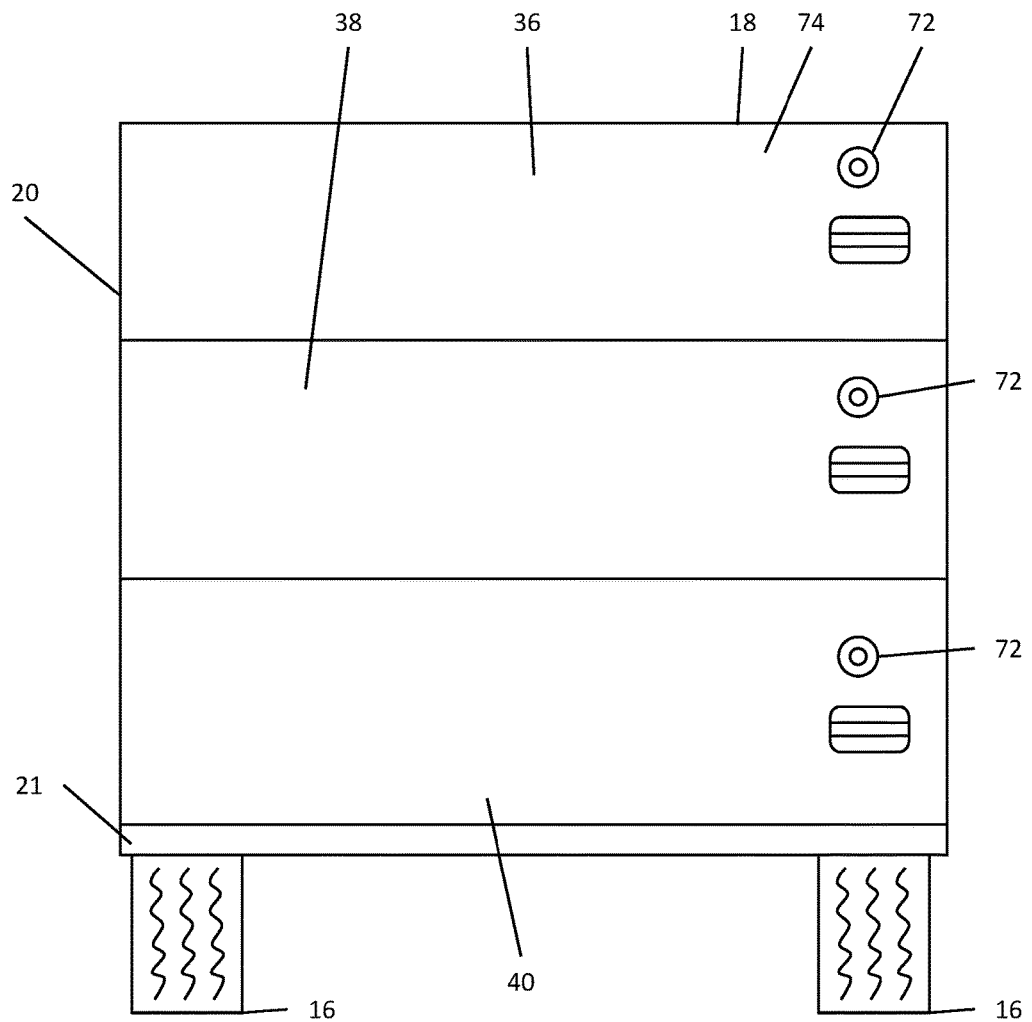
FIG. 2 is rear elevation view of a delivery vehicle in accordance with several embodiments.

In a preferred form, the separate temperature-controlled zones are disposed in a stacked orientation, as shown in FIG. 1 so that each zone extends the length of the storage compartment 18. As such, the zones can be distributed between a top compartment 30, a middle compartment 32, and a bottom compartment 34. With this configuration, the door 20 can be a single door providing access to all of the compartments 30, 32, 34 when opened, or, as shown in FIG. 2, the door 20 can include top, middle, and bottom doors 36, 38, 40, so that the compartments 30, 32, 34 can be accessed individually. Using multiple doors 36, 38, 40 advantageously preserves the cooling in compartments that would otherwise not be accessed or can shorten the time that a compartment is open for a particular delivery.

The delivery vehicle 10 can include one or more cooling systems 42 to control the temperature within the temperature-controlled zones, which can have any suitable configuration as known in the art. More specifically, each zone can have a dedicated cooling system, a single cooling system can control the temperature of multiple compartments, or the like. Alternatively, or in addition thereto, the zones can utilize passive cooling items 44, such as disposing ice or an equivalent thereof in the zones.

By one approach, the freezer compartment 24 can be the top compartment 30, the refrigerated compartment 26 can be the middle compartment 32, and the room-temperature compartment 28 can be the bottom compartment 34. This configuration advantageously allows cold air from the freezer compartment 24 to travel downwardly to cool the refrigerated compartment 26 and, subsequently, the room-temperature compartment 28. This efficiently utilizes the refrigeration produced by the cooling system 36 to maintain the relatively higher temperatures of the refrigerated and room-temperature compartments 26, 28. If desired, to aid in the downward travel of the cooled air, the top, middle, and bottom compartments 30, 32, 34 can be connected by one or more passageways 46.

By another approach, the freezer compartment 24 can be the bottom compartment 34, the refrigerated compartment 26 can be the middle compartment 32, and the room-temperature compartment 28 can be the top compartment 30. This configuration advantageously maintains the coldest temperatures in the bottom compartment 34. Of course, if desired, other configurations for the top, middle, and bottom compartments 30, 32, 34 can be utilized.

Figure 3:
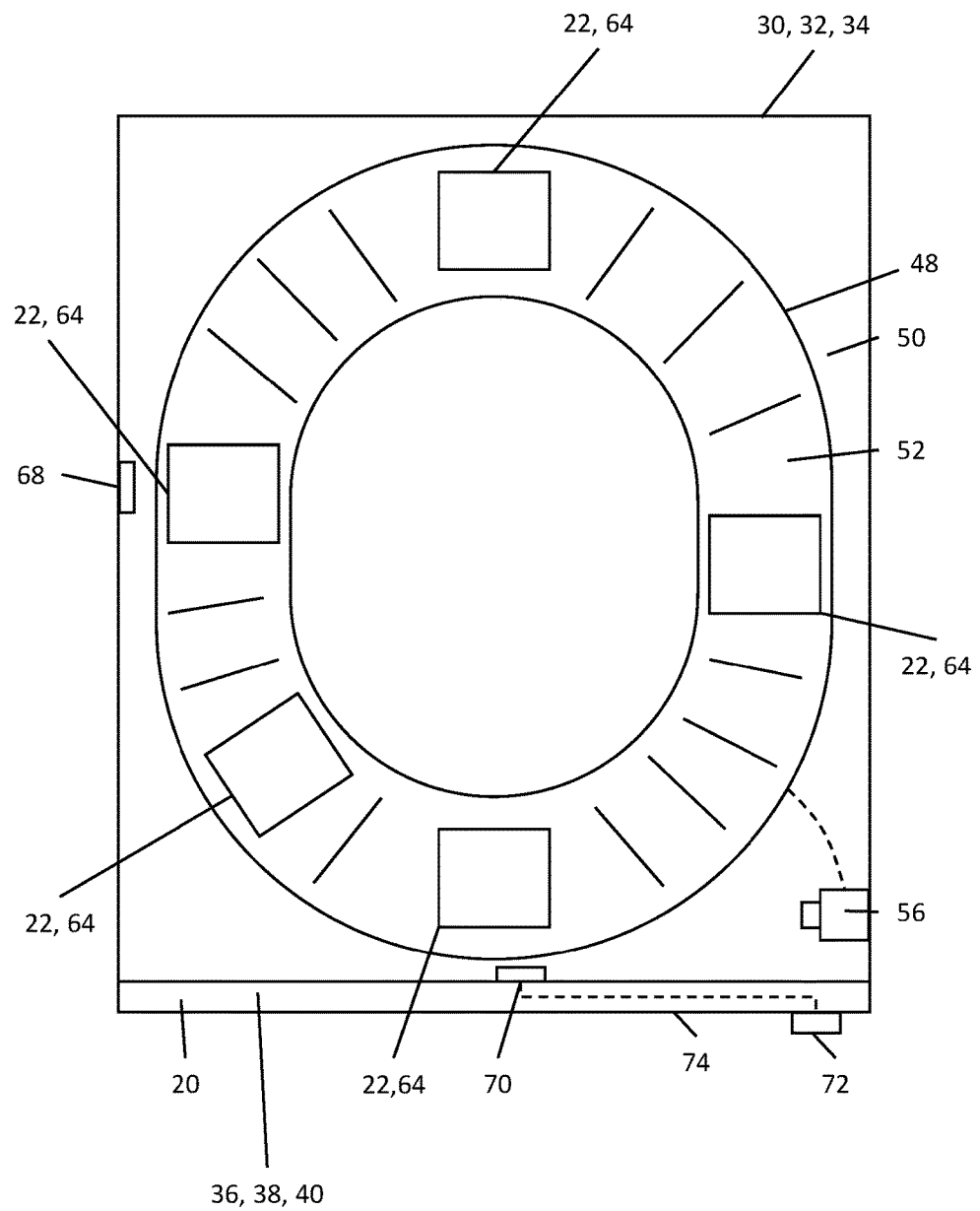
FIG. 3 is a top perspective view of a conveyor mechanism for a delivery vehicle in accordance with some embodiments.

Turning now to FIG. 3, a conveyor mechanism 48 is shown, which can be disposed in or adjacent to a bottom wall 50 of any or all of the compartments 30, 32, 34. The conveyor mechanism 48 is configured to convey items 22 within the respective compartment 30, 32, 34 to a position adjacent to the door 20 so that the delivery person can easily access the desired items 22 for delivery. As shown, the conveyor mechanism 48 includes a closed track 52 with a continuous path around the compartment 30, 32, 34, which can be a loop or oval as illustrated, or other continuous path if desired. The conveyor mechanism 48 drives the track 52 around the continuous path to thereby reposition items 22 within the respective compartment 30, 32, 34.

Figure 5:
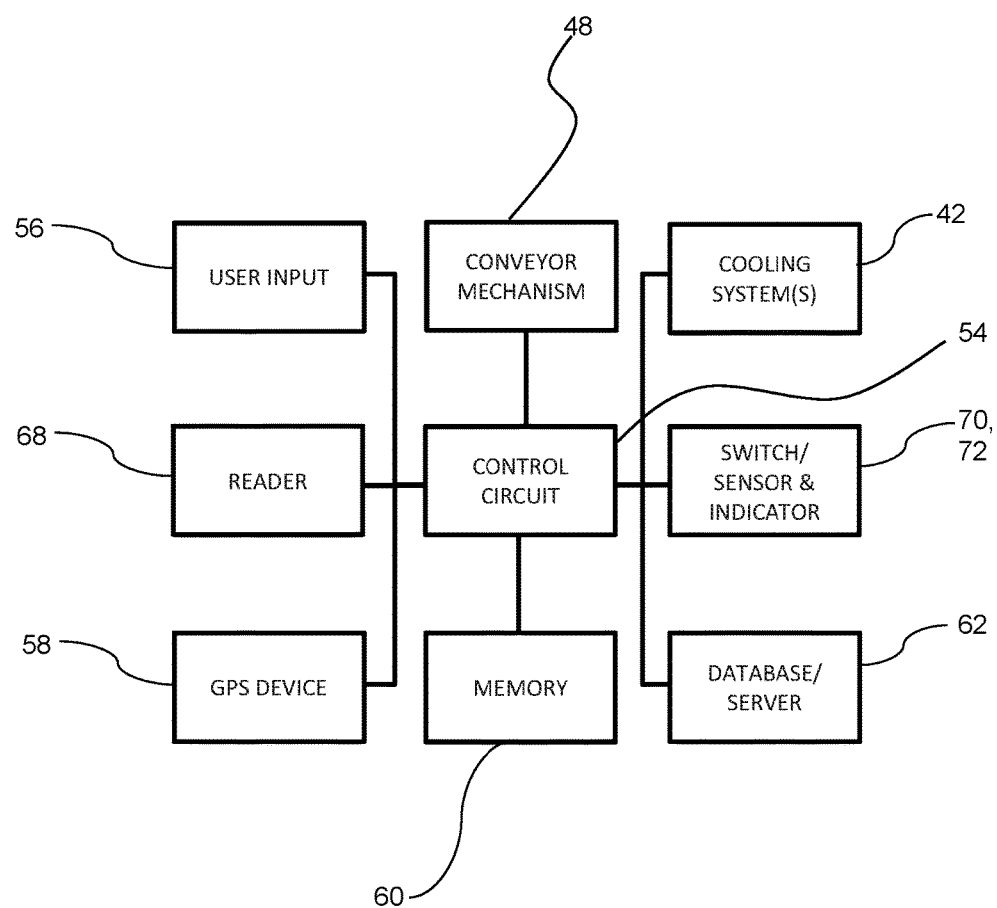
FIG. 5 is a diagrammatic view of a control circuit and components for a delivery vehicle in accordance with some embodiments.

By one approach, as shown in FIG. 5, the conveyor mechanism 48 can be independently controlled by a control circuit 54, which can be operably coupled thereto by a wireless or wired connection. The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 54 may be configured (for example, by using corresponding programming stored in a memory as will be well understood by those skilled in the art) to carry out one or more of the steps, actions, and/or functions described herein. The control circuit 48 can also be configured to control operation of the cooling systems 42 to control the temperature within the compartments 30, 32, 34.

By one approach, the conveyor mechanism 48 can include user inputs 56 configured to send signals to the control circuit 54, through a wireless or wired connection, to operate the conveyor in one or both directions and manually select item positioning. By further approaches, the control circuit 54 can be configured to position one or more items 22 adjacent to the door 20 based on various inputs. In a first example, a global positioning system (gps) device 58 can send positional data of the delivery vehicle 10 to the control circuit 54. The gps device 58 can be remote or local to the delivery vehicle 10 and can communicate with the control circuit 54 over any suitable connection, including a wired connection or wireless connections, such as radio communication, the Internet, or other protocols. The control circuit 54 can further be sent or configured to retrieve delivery location data and delivery item data, such as from a local memory 60 or a remote server or database device 62. So configured, the control circuit 54 can determine a location of the delivery vehicle 10, determine which items 22 within the respective compartments 30, 32, 34 are intended for delivery in that location, and operate the conveyor mechanism 48 to position the items 22 adjacent to the door. This not only reduces delivery times, but also reduces cooling costs by minimizing the time that the door 20 is open to retrieve the items 22 as compared to having to search through all of the items 22 on the conveyor.

In a second example, the control circuit 54 can be sent or configured to retrieve delivery rout data including a number of stops therefor and delivery item data identifying which items 22 in the compartments 30, 32, 34 are for each stop on the delivery rout, such as from the local memory 60 thereof or the remote server or database device 62. So configured, the control circuit 54 can be configured to operate the conveyor mechanism 48 to position items 22 adjacent to the door 20 for the first stop on a delivery rout and can be configured to subsequently operate the conveyor mechanism 48 to position items 22 adjacent to the door 20 based on the respective stop along the delivery rout.

Figure 4:
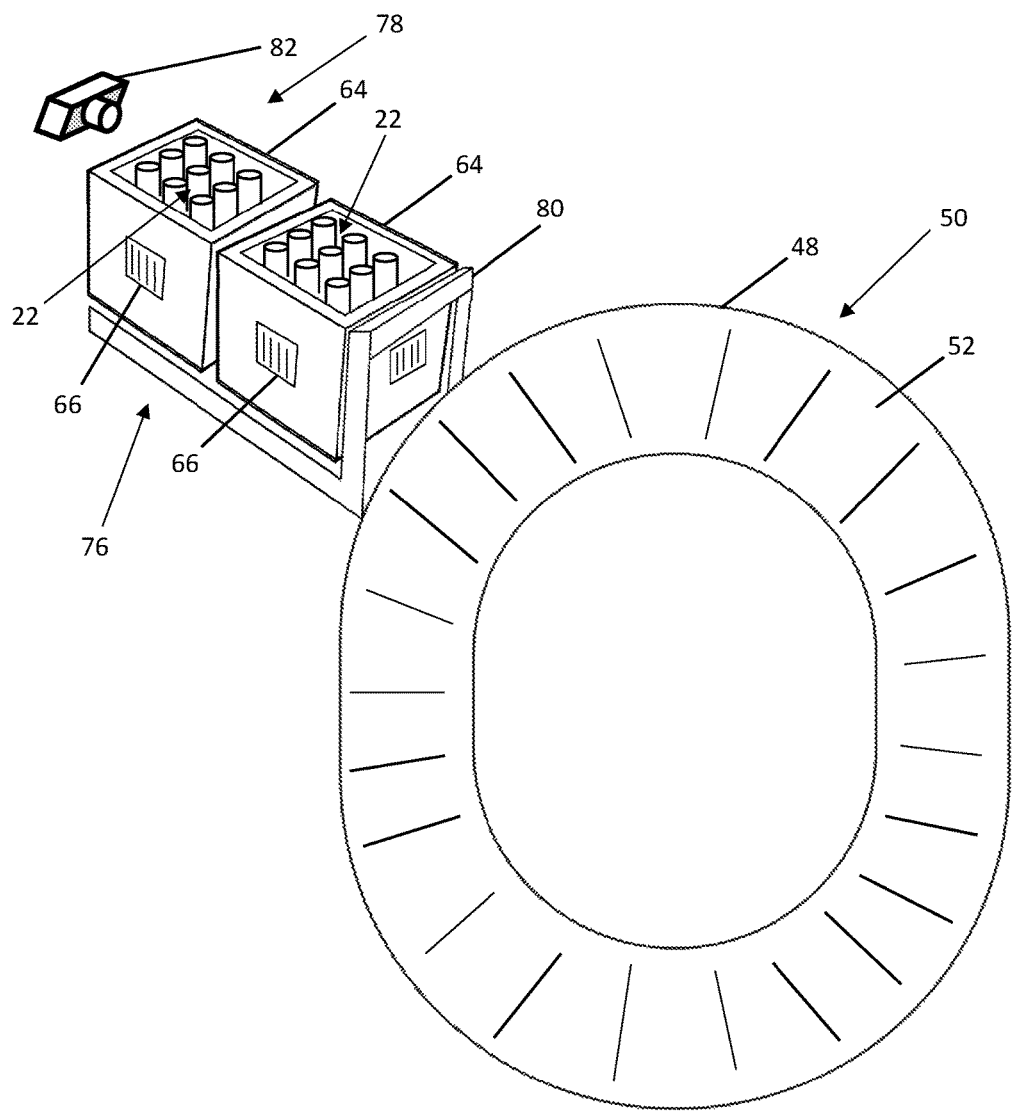
FIG. 4 is a top perspective view of a conveyor mechanism and side loading area for a delivery vehicle in accordance with several embodiments.

If desired, the items 22 can be transported within a tote 64 or other container, such as bag or the like, for easy storage, maneuverability within the compartments 30, 32, 34 on the conveyor track 50, and handling. If desired, the tote 64 can include identification information 66, as shown in FIG. 4, identifying the items 22 within the tote 64 or identifying a particular delivery location for the items 22 within the tote 64. The identification information 66 can be a machine readable code, such as a barcode, QR code, or the like, or can be an identification chip, such as a passive or active radio frequency identification chip. The delivery vehicle 10 can include a corresponding reader 68 configured to read or query for the identification information 66 and send the identification information 66 to the control circuit 48 for processing. With this configuration, if desired, a delivery person can be provided with the identification information 66 and can send the identification information 66 to the control circuit 48, such as through the reader 68, and the control circuit 48 can then position the desired tote 64 adjacent to the door 20 for easy access.

As shown FIGS. 2, 3, and 5, with any of the above configurations, the delivery vehicle 10 can further include a switch device or sensor 70 that is configured to actuate or identify when an item 22 or tote 64 is positioned adjacent to the door 20. For example, the switch device 70 can be a push button switch device with an actuator configured to be depressed when the item 22 or tote 64 is positioned adjacent by the door 20. In another example, the sensor 70 can be a proximity sensor configured to detect when an object is positioned adjacent thereto. Next, the delivery vehicle 10 can include an indicator 72, such as one or more light sources, disposed on an exterior 74 thereof, such as the door 20 or closely adjacent thereto, to indicate to a delivery person that the item 22 or tote 64 is positioned adjacent to the door 20 for delivery. With the configuration utilizing multiple doors 36, 38, 40, each door 36, 38, 40 and corresponding compartments 30, 32, 34 can include switch devices or sensors 70 and corresponding indicators 72. So configured, if a particular delivery location does not have items 22 within every compartment 30, 32, 34, the indicators 72 will show a delivery person which doors 36, 38, 40 to open to retrieve the items 22, which preserves cooling within the unopened compartments 30, 32, 34. As shown in FIG. 5, the switch device or sensor(s) 70 and the indicator(s) 72 can be operably coupled, by wireless or wired connections, to the control circuit 54 to be controlled thereby.

By another approach shown in FIG. 4, the items 22 or totes 64 can be stored in an area 76 adjacent to the conveyor mechanism 48 within the compartments 30, 32, 34. A transfer mechanism 78, such as a gravity feed with a gate 80, pusher mechanism 82, or the like, can be configured to operate and transfer items 22 or totes 64 to the conveyor mechanism 48. The transfer mechanism 78 can be operated by the control device 54 to deposit items 22 or totes 64 on the conveyor mechanism 48 by delivery location, as space is freed on the conveyor mechanism 48, or the like.

In some embodiments, a delivery vehicle is described herein that includes a temperature-controlled compartment, a door providing access to the temperature-controlled compartment, one or more containers disposed within the temperature-controlled compartment, and a conveyor mechanism disposed at least partially within the temperature-controlled compartment and configured to convey the one or more containers about a continuous path within the temperature-controlled compartment such that the containers are accessible through the door. The delivery vehicle can further include a control circuit configured to control operation of the conveyor mechanism.

By some approaches, the control circuit can be configured to position a particular container of the one or more containers adjacent to the door with the conveyor mechanism based on location data of the delivery vehicle. By a further approach, the delivery vehicle can include a switch device disposed adjacent to the conveyor and a light coupled to the switch device. As such, the switch device can be configured to be activated by a container positioned adjacent to the door and illuminate the light to provide a visual indication that the particular container is adjacent to the door.

By several approaches, the control circuit can be configured to position a particular container of the one or more containers adjacent to the door based on delivery rout information.

By some approaches, the temperature-controlled compartment can include three compartments and the conveyor mechanism can include three conveyor mechanisms. As such, the three compartments can include a freezer compartment, a refrigerated compartment, and a room temperature compartment, and each of the three compartments can have an associated conveyor mechanism. By further approaches, the three compartments can be arranged in a stacked configuration with the refrigerated compartment disposed between the freezer compartment and the room temperature compartment. By further approaches, the door can include three doors, one for each of the three compartments. By further approaches, each of the containers can include identification information and the control circuit can be configured to operate the conveyor mechanism to position an identified container adjacent to the door in response to reception of the identification information for the identified container.

Figure 6:
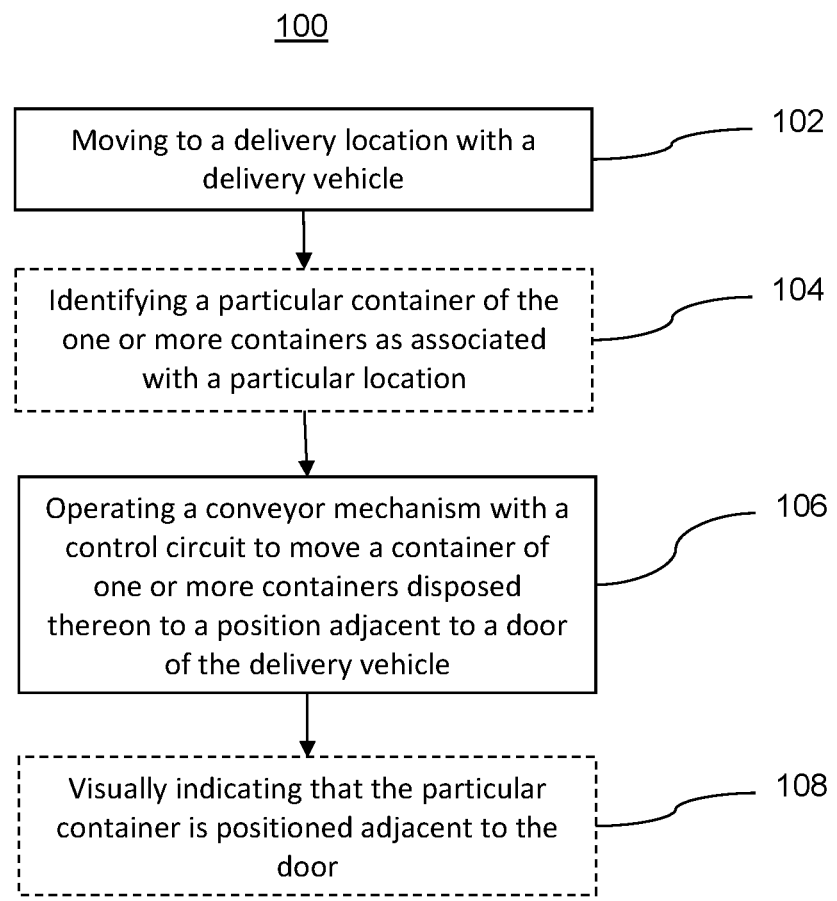
FIG. 6 is a flowchart in accordance with several embodiments.

In several embodiments and as shown in FIG. 6, a method 100 for delivery of food products is described herein that includes moving 102 to a delivery location with a delivery vehicle. The delivery vehicle can include a temperature-controlled compartment with one or more containers therein, a door providing access to the temperature-controlled compartment, and a conveyor mechanism disposed at least partially within the temperature-controlled compartment and configured to convey the one or more containers about a continuous path within the temperature-controlled compartment. The method further includes operating 102 the conveyor mechanism with a control circuit to move a container of the one or more containers disposed thereon to a position adjacent to the door.

By some approaches, the method can further include identifying 104 a particular container of the one or more containers as associated with a particular location. As such, operating the conveyor mechanism with the control circuit can include operating the conveyor mechanism to position the particular container adjacent to the door based on location data of the delivery vehicle. By further approaches, the method can further include visually indicating 106 that the particular container is positioned adjacent to the door.

By several approaches, the temperature-controlled compartment can include three compartments including a freezer compartment, a refrigerated compartment, and a room temperature compartment and the conveyor mechanism can include three conveyor mechanisms, each of the three compartments having an associated conveyor mechanism. As such, operating the conveyor mechanism with the control circuit can include selectively operating each of the conveyor mechanisms to move containers of the one or more containers within each of the three compartments to positions adjacent to the door.

By some approaches, the method can further include receiving identification information for the one or more containers and receiving particular identification information to request a particular container of the one or more containers. As such, operating the conveyor mechanism with the control circuit can include operating the conveyor mechanism to position the particular container adjacent to the door in response to receiving the particular identification information.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A delivery vehicle comprising:
   a temperature-controlled compartment;
   a door providing access to the temperature-controlled compartment;
   one or more containers disposed within the temperature-controlled compartment;
   a conveyor mechanism disposed at least partially within the temperature-controlled compartment and configured to convey the one or more containers about a continuous path within the temperature-controlled compartment such that the containers are accessible through the door; and
   a control circuit configured to:
      receive, from a positional sensing mechanism, positional data for the delivery vehicle;
      determine, based on the positional data for the delivery vehicle, a location of the delivery vehicle;
      determine, based on the location of the delivery vehicle, a next delivery location;
      determine, based on the next delivery location, a particular container, wherein the particular container is associated with the next delivery location;
      determine a location of the particular container within the temperature-controlled compartment; and
      control operation of the conveyor mechanism such that the particular container is moved adjacent to the door.

2. The delivery vehicle of claim 1, further comprising a switch device disposed adjacent to the conveyor and a light coupled to the switch device, the switch device configured to be activated by a container positioned adjacent to the door and illuminate the light to provide a visual indication that the particular container is adjacent to the door.

3. The delivery vehicle of claim 1, wherein the determination of the next delivery location is further based on delivery rout information.

4. The delivery vehicle of claim 1, wherein the temperature-controlled compartment comprises three compartments and the conveyor mechanism comprises three conveyor mechanisms, the three compartments including a freezer compartment, a refrigerated compartment, and a room temperature compartment, each of the three compartments having an associated conveyor mechanism.

5. The delivery vehicle of claim 4, wherein the three compartments are arranged in a stacked configuration with the refrigerated compartment disposed between the freezer compartment and the room temperature compartment.

6. The delivery vehicle of claim 4, wherein the door comprises three doors, one for each of the three compartments.

7. The delivery vehicle of claim 4, wherein each of the containers includes identification information and the control circuit is configured to operate the conveyor mechanism to position an identified container adjacent to the door in response to reception of the identification information for the identified container.

8. The delivery vehicle of claim 4, further comprising a passive cooling item disposed on the conveyor mechanism between adjacent containers.

9. The delivery vehicle of claim 1, wherein the conveyor mechanism is oval shaped.

10. The delivery vehicle of claim 1, wherein the positional sensing mechanism is a global positioning system (GPS) device.

11. A method for delivery of food products via a delivery vehicle, the method comprising:
receiving, from a positional sensing mechanism, positional data for the delivery vehicle;
determining, based on the positional data for the delivery vehicle, a location of the delivery vehicle, wherein the delivery vehicle includes a temperature-controlled compartment with one or more containers therein, a door providing access to the temperature-controlled compartment, and a conveyor mechanism disposed at least partially within the temperature-controlled compartment and configured to convey the one or more containers about a continuous path within the temperature-controlled compartment;
determining, based on the location of the delivery vehicle, a next delivery location;
determining, based on the next delivery location from the one or more containers, a particular container, wherein the particular container is associated with the next delivery location;
determining a location of the particular container within the temperature-controlled compartment; and
operating the conveyor mechanism with a control circuit to move the particular container to a position adjacent to the door.

12. The method of claim 11, further comprising visually indicating that the particular container is positioned adjacent to the door.

13. The method of claim 12, wherein visually indicating that the particular container is positioned adjacent to the door comprises the particular container activating a switch and illuminating a light in response to the switch being activated.

14. The method of claim 11, wherein the determining the next delivery locations is further based on delivery rout information.

15. The method of claim 11, wherein the temperature-controlled compartment comprises three compartments and the conveyor mechanism comprises three conveyor mechanisms, the three compartments including a freezer compartment, a refrigerated compartment, and a room temperature compartment, each of the three compartments having an associated conveyor mechanism; and operating the conveyor mechanism with the control circuit comprises selectively operating each of the conveyor mechanisms to move containers of the one or more containers within each of the three compartments to positions adjacent to the door.

16. The method of claim 15, wherein the door comprises three doors, one for each of the three compartments; and further comprising visually indicating whether a container of the one or more containers is positioned adjacent to each of the doors.

17. The method of claim 11, further comprising receiving identification information for the one or more containers and receiving particular identification information to request the particular container of the one or more containers; and wherein operating the conveyor mechanism with the control circuit comprises operating the conveyor mechanism to position the particular container adjacent to the door in response to receiving the particular identification information.

18. The method of claim 11, wherein the positional sensing mechanism is a global positioning system (GPS) device.

* * * * *